D. D. DRAPER.
EYEGLASSES OR SPECTACLES.
APPLICATION FILED JULY 21, 1916.
1,230,136.
Patented June 19, 1917.
Fig. 1.
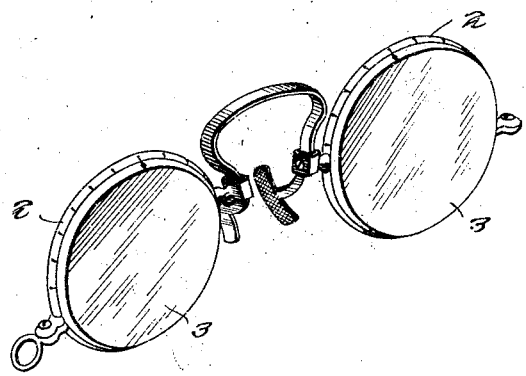
Fig. 2.    Fig. 3.    Fig. 4.
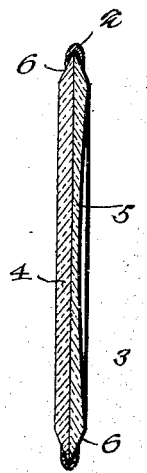 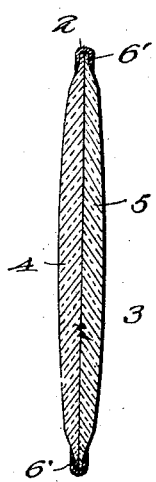 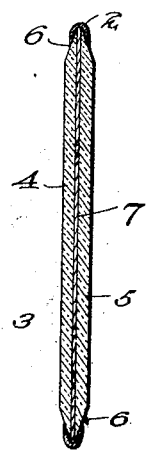
Inventor
Daniel D. Draper,
Witnesses
By Victor J. Evans
Attorney

UNITED STATES PATENT OFFICE.

DANIEL D. DRAPER, OF LINCOLN, NEBRASKA.

EYEGLASSES OR SPECTACLES.

1,230,136.　　　　Specification of Letters Patent.　　Patented June 19, 1917.

Application filed July 21, 1916. Serial No. 110,587.

*To all whom it may concern:*

Be it known that I, DANIEL D. DRAPER, a citizen of the United States, residing at Lincoln, in the county of Lancaster and State of Nebraska, have invented new and useful Improvements in Eyeglasses or Spectacles, of which the following is a specification.

This invention relates to improvements in eye glasses or spectacles, and particularly to a novel construction of compound lenses or compound lenses and prisms in connection with a novel construction of rim for receiving and holding the same, whereby a person may be fitted with a proper compound lens for temporary use while regular lenses are being ground according to prescription, or whereby a person may be fitted with glasses and adjustments made until the exact kind of glass for any ordinary or peculiar visual defect may be determined.

The object of the invention is to provide a construction whereby two different kinds of lenses, or a lens and a prism, or lenses with an interposed colored body, may be secured within a rim frame and properly adjusted to meet any visual defect and in such a manner that the compounded lenses will have one face plane and the width of an ordinary single lens.

The invention consists of the features of construction, combination and arrangement of parts hereinafter fully described and claimed, reference being had to the accompanying drawing in which:—

Figure 1 is a perspective view of a pair of eyeglasses embodying my invention.

Fig. 2 is a section through one pair of lenses and the rim frame within which they are fitted.

Fig. 3 is a similar view showing a modification in the construction of the lenses.

Fig. 4 is a view similar to Figs. 2 and 3 showing the use of a colored disk.

It is very well known in the art that opticians and optometrists are not ordinarily equipped with facilities for grinding lenses according to prescriptions, particularly in the small towns and cities, and that it is therefore often necessary for a customer desiring certain kinds of glasses to wait for a period of from one to three or more days before his order can be filled by the optician or optometrist, who has the grinding work done by a dispensing house. In the meantime the customer or patient is often compelled to undergo considerable suffering or inconvenience. In many cases, also, it is doubtful whether a particular lens or prism will correct certain visual defects, which can be determined only by actual use by the patient of glasses, which may have to be changed from time to time, until the exact condition is met.

It is the essential purpose of my invention to overcome these objections and inconveniences by the provision of compound lenses or prisms and frame rims whereby any combination of lenses or prisms may be produced to meet any visual defect in such a manner that the compounded lens will have one face plane and the width of an ordinary single lens, and, whereby the patient or customer of an optical establishment may be furnished with temporary glasses suited to his condition until permanent lenses made according to prescription are obtained from a dispensing house; and also whereby the optician or optometrist may, where the case requires it, fit the patient with glasses and change the same from time to time, according to any idiosyncracies which may develop, until the exact condition is met, so that accurate permanent lenses may be obtained. Furthermore, the invention provides a means by which the lenses may be colored as desired or required by the use of interposed colored disks.

Referring to the drawing, 1 designates a pair of eye glasses, to which the invention is shown in the present instance applied, and which includes frame rims 2, which, in accordance with my invention, are made of channeled form or internally grooved, and of greater than ordinary width. The rim frames 2 are equipped with what, for convenience, may be termed compound lenses 3, each consisting of a pair of lenses 4 and 5. While I have set forth, for convenience of illustration, a pair of lenses, it is to be understood that the term includes prisms, and that by the use of the term "compound lens" it is to be understood that I mean a pair of lenses, of any kind or in any combination, or a lens and a prism, as occasion may require in making up the compound lens to suit any visual defect.

In order to adapt the lenses to be fitted within the channeled rim frame, the peripheral edges of the lenses are reduced, so that the aggregate width of the peripheral edges of a pair of lenses when fitted together, will not be greater than the width of the channel in the rim frame. As shown in Fig. 2, I secure this result by providing the outer face of each lens with a beveled surface, the beveled surfaces of the lenses being so formed as to provide a V-shaped periphery for the compound lens, which fits within the channeled rim, this construction allowing a pair of the lenses to be fitted together, irrespective of their combined thickness, and to also be used in conjunction with interposed colored disks, as hereinafter described. The peripheral portions of the lenses may also be reduced by cutting their outer surfaces away on parallel lines to form flattened flanges 6', as illustrated in the modified form shown in Fig. 3. Any other equivalent means of reducing the peripheral edges of the lenses for the purpose described may be employed. The constructions above described enable two lenses to be fitted together, independently of connection with one another to form a compound lens having one face plane and the width of an ordinary single lens.

It will thus be evident that lenses or lenses and prisms may be combined to form a compound lens to suit any individual case for the correction of various visual defects, such as the various convex or concaved lenses or bi-focal lenses, and prisms of various kinds, and to enable these to be properly and adjustably fitted in position I provide the faces of the lens frames with degree and diopter scales, so that the lenses or prisms can be easily placed in the desired position, and the lenses are also marked in any suitable manner to show the axis of a cylinder or base of a prism, as the case may be, from which it will be understood that the lenses may be accurately set in position.

It will thus be apparent that the customer or patient of an optician or optometrist, after having his eyes tested, may be supplied pending the fitting of permanent glasses, with temporary glasses suited to his condition, and that in case of any doubt as to the exact condition to be met, the patient may be allowed to wear glasses which may be adjusted from time to time until the condition is fully met, when a proper pair of permanent glasses will be supplied, the advantage of which are evident.

In order to provide for the ready adjustment of the lenses in the lens frames, the frames and lenses are preferably made of circular form in outline, so that the lenses may be turned or adjusted within the frames as occasion may require. In order to provide for the use of any color effect that may be desired, I may also employ, as shown in Fig. 4 a transparent or translucent colored disk 7 of the desired kind which is clamped between the lenses, so that blue, amber and yellow or other tint glasses may be furnished in a ready and convenient manner.

I claim:—

In eye glasses or spectacles, a rim frame, and a compound lens fitted therein comprising a plurality of independent lens members having peripheral portions conjointly engaging said rim frame, said lens members being compounded so as to have one face plane and the width of an ordinary single lens.

In testimony whereof I affix my signature.

DANIEL D. DRAPER.